United States Patent [19]

Grote et al.

[11] Patent Number: 5,540,270

[45] Date of Patent: Jul. 30, 1996

[54] PROCESS FOR WET REGENERATION OF GRANULAR BULK MATERIALS CHARGED WITH IMPURITIES AND POLLUTANTS

[75] Inventors: Johannes Grote, Goslar; Ulrich Thiem, Waldbüttelbrunn, both of Germany; Terry D. Skidmore, Reston, Va.

[73] Assignee: Noell Abfall-Und Energietechnik GmbH, Neuss, Germany

[21] Appl. No.: 266,978

[22] Filed: Jun. 27, 1994

[30] Foreign Application Priority Data

Jun. 26, 1993 [DE] Germany .......................... 43 21 297.2

[51] Int. Cl.⁶ .................................................. B03B 1/00
[52] U.S. Cl. ................................................ 164/5; 209/5
[58] Field of Search ............................ 164/5; 209/4, 5, 209/17, 38, 39

[56] References Cited

U.S. PATENT DOCUMENTS

| | | | |
|---|---|---|---|
| 2,331,102 | 12/1940 | Bird | 164/5 |
| 2,783,511 | 2/1954 | Will et al. | 164/5 |
| 2,784,468 | 3/1957 | Booth et al. | 164/5 |
| 4,303,453 | 12/1981 | Jung et al. | 209/39 |
| 4,449,566 | 5/1984 | Filipovitch et al. | 209/39 |
| 4,569,768 | 2/1986 | McKinley | 209/5 |
| 4,685,973 | 8/1987 | Ashton | 164/5 |
| 4,960,162 | 10/1990 | Millager | 164/5 |
| 5,219,123 | 6/1993 | Jacob | 164/5 |

FOREIGN PATENT DOCUMENTS

| | | |
|---|---|---|
| 343272 | 5/1988 | European Pat. Off. . |
| 44942 | 1/1992 | Japan . |
| 417240 | 8/1971 | U.S.S.R. . |
| 762291 | 1/1979 | U.S.S.R. . |
| 1276424 | 7/1985 | U.S.S.R. . |

OTHER PUBLICATIONS

Encyclopedia of Chemical Technology vol 10 pp. 489–516 (1980).

Primary Examiner—Jack W. Lavinder
Assistant Examiner—Randolph S. Herrick
Attorney, Agent, or Firm—Cohen, Pontani, Lieberman, Pavane

[57] ABSTRACT

Disclosed is a process for treatment of bulk materials which are loaded with impurities and pollutants. Preferably the process treats bulk material from the category of clay-bonded used foundry sand. Depending on the provenance of the sand, composition of the sand, and the type of binders employed, this sand is subjected to a regeneration process including dry mechanical pretreatment and wet attrition treatment to produce regenerated sand and fine grain-containing waste water. The fine grain-containing waste water is subjected to a multiple-stage waste water treatment based on agglomeration processes after adjustment of the pH level of the waste water.

30 Claims, 1 Drawing Sheet

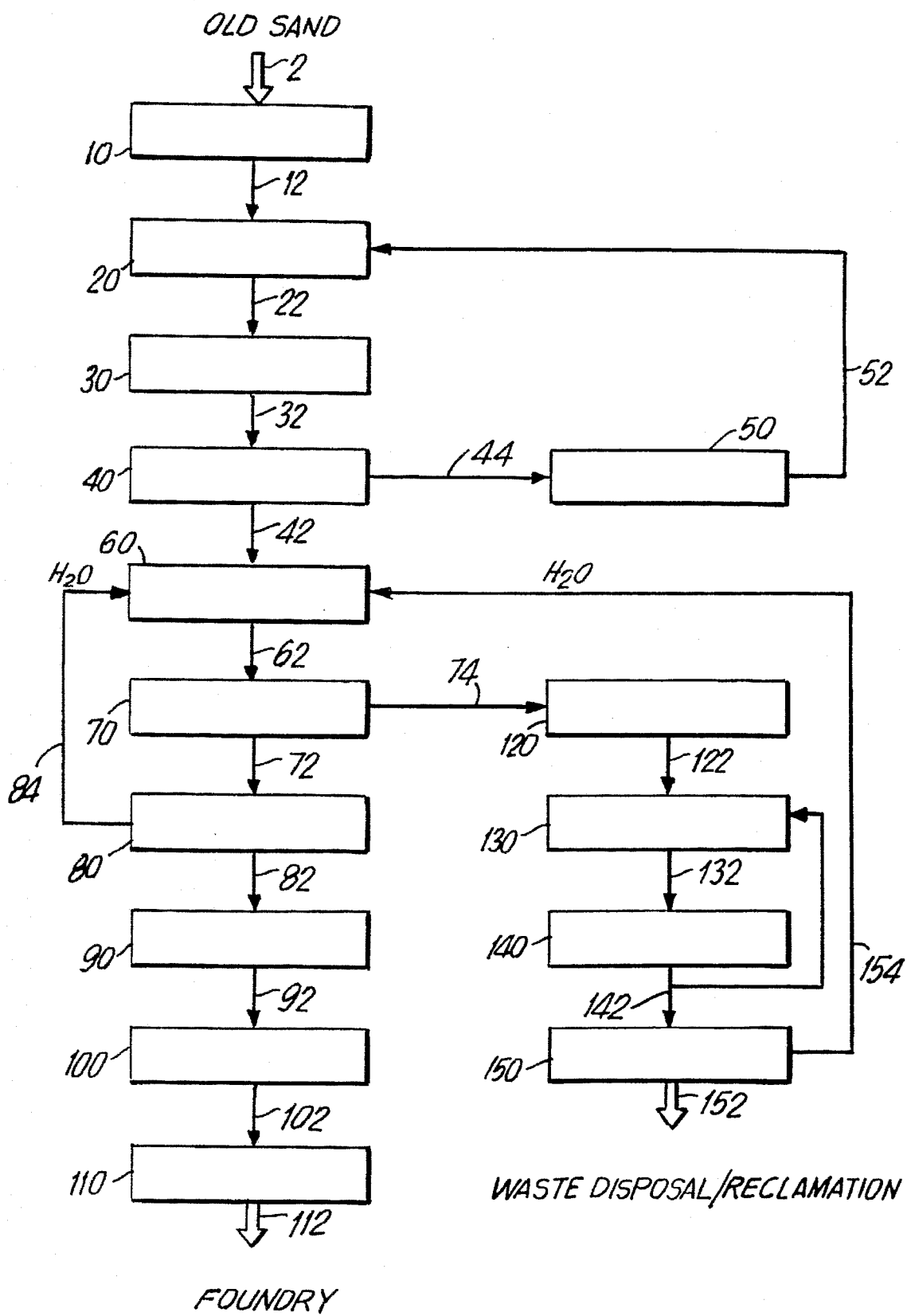

PROCESS FOR WET REGENERATION OF GRANULAR BULK MATERIALS CHARGED WITH IMPURITIES AND POLLUTANTS

BACKGROUND OF THE INVENTION

1. Field of the Invention

The present invention relates to a process for wet regeneration of granular bulk materials charged with impurities and pollutants. In particular, the present invention relates to a process for wet regeneration of clay-bonded used foundry sand.

2. Description of the Prior Art

Foundry sand is typically used in foundries to make molds for the casting of metal shapes. A typical use of the sand is as core sand. Core sand is the sand employed in a core during molding. Core sand may comprise standard molding-sand mixtures or silica sand, usually with a binder.

A process and a device for wet regeneration of clay-bonded "used" foundry sand is known from AT-PS 387 921. In this process, sand is cleaned by two or more friction scrubbing installations (attrition cells) and then de-sludged in a multiple-stage de-sludging and de-watering arrangement to form regenerated sand. A preliminary de-sludging step for removing fine-grain abraded material is carried out between the individual stages to optimize the attrition process.

The cleaned and de-sludged sand, i.e. regenerated sand, is then dried, cooled and stored temporarily. Then the regenerated sand can be supplied to the foundry or another consumer in this form for reuse.

A disadvantage in this process is that it is difficult to construct a waste water treatment stage to employ with this process technology. Consequently, such construction is cost intensive. The waste water removed, as a filtrate, from the cleaning process for treatment is characterized by a small proportion of solids, a high proportion of fine grains in the solids, and a high buffer capacity.

The high proportion of fine grains in the solids, which include fine-grain carbon, quartz and bentonite and other additions depending upon the sands processed, cannot be separated in a simple and economical manner by the process described in AT-PS 387 921. The solids cause a residual turbidity in the waste water. Accordingly, a more extensive cleaning of the waste water with respect to anticipated pollutants, in particular residual phenol, cannot be carried out with the known process due to the residual turbidity in the waste water. Consequently, circulation of the waste water is subject to substantial restrictions.

It would be desirable to provide a process for regenerating sand or other pollutant-containing granular bulk materials which reduces the cost of such regeneration and avoids producing difficult to treat waste water.

SUMMARY OF THE INVENTION

An object of the present invention is to provide a process for regenerating pollutant-containing granular bulk materials which provides high yields of regenerated granular bulk materials at reduced cost.

It is another object of the present invention to provide a process for regenerating contaminated pollutant-containing granular bulk materials without producing a waste water stream laden with a high proportion of fine grains in its solids.

The present invention achieves these objects by providing a process for wet regeneration of granular bulk materials comprising impurities and pollutants. The process comprises adding water to the granular bulk material. The granular bulk material then undergoes wet attriting in the presence of the water to form an attrited particle stream comprising a suspension of particles of the attrited material and the water. The attrited particle stream is classified to separate the attrited particle stream into a first stream and a second stream. The first stream comprises a first portion of particles of the attrited material and the water. The second stream comprises a second portion of the particles of the attrited material stream and the water. The first stream comprises particles having a smaller particle size than the particles of the second stream. To the first stream is added at least one cationic flocculant, anionic flocculant, non-ionic flocculant and mixtures thereof. Also, at least one fine-grain auxiliary material may be added to the first stream to form a separator feed stream. The pH of the first stream is adjusted, prior to adding the at least one flocculent and the at least one auxiliary material, to a pH level compatible with the at least one flocculant and at least one auxiliary material. The pH is adjusted by addition of at least one acid or at least one caustic soda solution. The separator feed stream is separated into a clarified water stream comprising a portion of the water of the separator feed stream and a product stream comprising the particles in the separator feed stream.

The present invention also achieves these objects by providing an apparatus comprising a means for pretreating granular bulk materials comprising an attrition device for attriting the granular bulk materials in the presence of water. The attriting device produces an attrited stream comprising the attrited particles and water. A classifying device is included for separating the attrited particle stream into a first stream comprising a first portion of attrited particles and water and a second stream comprising a second portion of attrited particles and water. The first portion of particles comprise particles having a smaller particle size than the particles of the second portion. A means for adjusting a pH level of the first stream is also provided. At least one flocculation stage is present for mixing at least one flocculant with the first stream to form a separator feed stream. A separating device is provided for separating solids in the separator feed stream from water in the separator feed stream.

The various features of novelty which characterize the invention are also pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The sole FIGURE shows a flow chart of components of the present invention and the order in which process streams flow between various components.

DETAILED DESCRIPTION OF THE PRESENTLY PREFERRED EMBODIMENTS

The process and apparatus of the present invention subjects contaminated and pollutant-charged granular bulk materials to a dry mechanical pretreatment which includes comminution of sand lumps, magnetic separation, protective screening, i.e. sieving, and secondary comminution of overflow from sieving. Typically, the granular bulk materials are pure molding sand, resin-bonded core sand and mixtures of molding sand and core sand. The process is also suitable for regeneration of blasting grit, as well as for cleaning earths containing fine grains and coarse clay. However, in the following description the material will be termed "sand".

The pretreated sand is preferably processed in multiple attrition cells with the addition of water. Fines are removed from the surface of grains of the sand by intensive agitation movement in the attrition cells. The fines are separated from the sand as a fine-grained suspension in one or more subsequent grading devices, i.e. classifying stages. The separated sand is introduced into a conditioner device in which the surface of the sand is neutralized. Subsequently, the sand is de-watered and dried thermally to form regenerate. The regenerate is cooled and transferred by pneumatic conveyors to silos where the regenerate is stored.

The fine-grained suspension leaving the classifying stages is subjected to a waste water treatment according to the present invention which includes adjusting the pH of the waste water, multiple-stage adding of flocculants, additional metering of auxiliary materials, and separating solids and liquids. The term "flocculants" includes chemicals employed to effect flocculation as well as chemicals employed to assist or promote flocculation.

The waste water treatment produces a sludge which can be used in the molding sand circulation of foundries or as additives in other branch industries, e.g. road construction, dump construction, manufacture of molded blocks cement and brick. The proportion of fines to be disposed of can be considerably reduced through such potential industrial uses.

Preferably, the treatment of waste water includes adjusting the pH value of the waste water to a value of 5 or less. This pH adjusting has been found particularly advantageous. The pH may be adjusted by addition to the waste water of acids or caustic soda solutions, as appropriate and compatible with downstream processing. However, sulfuric acid is preferably used for altering and adjusting the pH value. Preferably the flocculants added to the waste water include polyacrylamide and/or polyacrylate-based high polymer organic reagents. In place of, or in addition to these organic reagents, inorganic flocculants in the form of polyvalent ions are added to the waste water during the treatment process to support the flocculation.

The flocculation produces a floc-containing suspension which is subsequently dewatered. Preferably, a partial flow, i.e. slip stream, of the floc-containing suspension, rather than being fed to dewatering, is returned as "germ former" to the first of the one or more flocculating stages to improve, most preferably optimize, the yield of floc forming during flocculation.

Also, auxiliary agents in the form of mineral and/or organic bulk materials are added to the various flocculation stages as carrier media to improve the flocculation. In particular, fine particle size adsorptive materials such as carbon and/or layer minerals, i.e. minerals occurring naturally as a stratified, fissile, laminated or layered structure, are added.

Moreover, the present invention separates solids and liquids by filtration and/or flotation process steps. Preferably, clarified water, if necessary, can be freed of organic pollutants by means of ultraviolet (UV) oxidation, ozone treatment or contact with active carbon filters. This is particularly useful when the treatment is to remove phenol-containing resins which pollute the sand. Such resins are typically present due to their use with the sand during core production at the foundry.

The components of the apparatus for performing the treatment process of the present invention are evident from the foregoing description of the treatment process. However, reference is made to the following description of the sole figure which more particularly shows a flow chart of an embodiment of the process and apparatus of the present invention.

A stream 2 of the "old sand", i.e. sand which has been employed in a foundry (not shown), is removed from the production circulation of the foundry and transferred to a silo 10. From the silo 10, the old sand is metered on a conveyor belt (not shown) via a screw conveyor (not shown) and passes as a stream 12 through a comminution unit 20 for comminuting any lumps of the old sand contained in stream 12. A stream 22 discharges from the comminution unit 20 and is fed to a belt operated magnetic separator 30 which removes any magnetic particles which may be contained in the stream 22 to produce a stream 32. Subsequently, stream 32 passes through a sieving device 40 to produce a sieved particle stream 42 and a sieve overflow stream 44. Sieved particle stream 42 comprises solids having a particle size which passes through the width of a mesh (not shown) employed in the sieving device 40. Sieve overflow stream 44 comprises solids having a particle size larger than that which can pass through the mesh width. Typically, the mesh in the sieving device 40 has a mesh width of approximately 1 millimeter (1 mm). This produces the sieved particle stream 42 to have a grain fineness particularly suitable for downstream wet processing described in detail below. The sieve overflow stream 44, containing the portion of the stream 32 having a particle size larger than approximately 1 millimeter, is fed to a second comminution unit 50 to produce a stream 52. Stream 52 is then recycled to the comminution unit 20 for reprocessing.

The old sand from the foundry, which has been pretreated as described above to form the sieved stream 42 of particles, is mixed with water from streams 84 and 154, as well as other water sources (not shown) if necessary, to form a suspension and fed to a multiple-cell attrition device 60 which produces an attrited particle stream 62. The solid content of the suspension is adjusted to approximately 50 to approximately 80% by mass to ensure the most intensive possible application of friction.

Violent agitating movement in the attrition cells removes fines from the surface of the sand particles of the stream 42. In so doing, adhering and dead bentonite, a type of clay, and portions of resin shells typically attached to the surface of the sand stream 2 and carried through the present process to stream 42, are also removed by the violent agitating movement. Thus, a stream 62 comprising water, sand, fines and the adhering and dead bentonite and portions of the resin shell discharges from the attrition device 60.

A classifying device 70, arranged downstream of the attrition device 60, separates stream 62 into a fine stream 74 and a sand stream 72. The classifying device 70, typically is a hydro-classifier. Preferably, the hydro-classifier is an up-current classifier, a hydro-cyclone classifier or a spiral-type classifier.

The sand stream 72 is treated in a conditioner (not shown) in which the surface of the sand of the sand stream 72 is neutralized. The conditioned sand is then fed to a dewatering device 80 to produce a dewatered stream 82 and a water stream 84. The dewatered stream 82 is fed to a dryer 90 to produce a regenerate stream 92. The regenerate stream 92 is cooled in a cooler 100 to form a cooled stream 102 which is guided into silos 110 by pneumatic conveyors (not shown). Typically, the dewatering device 80 is a dewatering sieve and/or a plane filter. When desired, a stream 112 of the sand stored in the silos 110 can be sent back to the foundry (not shown).

The number of attrition stages of the attrition device 60 and classifying stages of classifying device 70 depends on the proportion of fines conveyed along with the old sand from the foundry and on the level of impurities in the old sand. The dwell time of the material in the attrition device 60 does not depend on the level of contamination of the sand or on requirements regarding the quality of the regenerate. The dwell time should amount to approximately 10 to approximately 15 minutes per attrition stage.

The stream 74 comprising the suspensions of fines and waste water occurring in an overflow from the classifying device 70 is collected in a storage tank (not shown). Then, stream 74 is fed to a pH adjusting device 120 where the pH of the stream 74 leaving the storage tank is adjusted and forms a pH adjusted stream 122. Preferably the pH of the stream 74 is adjusted with acid or caustic soda solutions to a pH level of 5.0 or less. Most preferably, the pH of the stream 74 is adjusted with sulfuric acid. The stream 122 is a suspension. Accordingly, it is treated subsequently to the pH adjustment, in two separate flocculation tanks 130 and 140 to cause particles in the suspension to form relatively larger flocs which can be relatively more easily removed. The effluent stream 132 is discharged from flocculation tank 130 and is fed to flocculation tank 140. The material removed from the flocculation tank 140 is discharged as stream 142 and guided into an intermediate storage tank (not shown) for sedimentation and flocculation so as to produce a sludge water stream. The discharged stream 142 contains flocs which serve as a nucleus for formation of larger flocs. Thus, optionally, a portion of the discharged stream 142 can be recycled as "germ former" to the first flocculating stage 130. The sludge water stream is fed to a filtration device 150 to produce a concentrated sludge stream 152 and a clarified water stream 154. The filtration device 150 may comprise a pre-coating filter, a shear-cell filter and/or flotation devices for separation of solids and liquids.

The concentrated sludge stream 152 comprises fines separated from the majority of the waste water and is either disposed of or, depending on the type of foundry, can be processed in a molding sand installation of the foundry. Since the fines in the sludge stream 152 contains still activatable bentonite, considerable savings on bentonite can be achieved by returning the fines to the molding sand circulating at the foundry.

The clarified water stream 154, occurring as a result of filtration device 150, is free of organic components, is stored temporarily in a tank (not shown) and can be returned to circulation again in the attrition device 60. A cleaning installation (not shown) operating on the basis of active carbon filters can be employed for detoxification of the clarified water stream 154. Another variant of the cleaning installation is to employ a UV oxidation system (not shown) for oxidizing the organic pollutants. The UV oxidation system oxides pollutants by intensive irradiation with ultraviolet light. This reaction can be accelerated by addition of oxidizing agents such as hydrogen peroxide or ozone.

The invention is not limited by the embodiments described above which are presented as examples only but can be modified in various ways within the scope of protection defined by the appended patent claims.

What is claimed is:

1. A process for wet regeneration of granular bulk materials comprising impurities and pollutants, comprising the steps of:

adding water to the granular bulk material;

wet attriting the granular bulk material in the presence of the water to form an attrited particle stream comprising a suspension of particles of the attrited material and the water;

classifying the attrited particle stream to separate the attrited particle stream into a first stream and a second stream, the first stream comprising a first portion of particles of the attrited particle stream and the water, the second stream comprising a second portion of the particles of the attrited particle stream and the water, the first stream comprising particles having a smaller particle size than the particles of the second stream;

adding to the first stream at least one flocculant selected from the group of cationic flocculants, anionic flocculants, non-ionic flocculants and mixtures thereof, and adding at least one fine-grain auxiliary material as carrier media, to form a separator feed stream;

adjusting the pH of the first stream, prior to adding the at least one flocculant and the at least one auxiliary material, to a pH level compatible with the at least one flocculant and at least one auxiliary material, by addition of a member selected from the group of acids and caustic soda solutions; and separating the separator feed stream into a clarified water stream comprising a portion of the water of the separator feed stream and a product stream comprising the particles in the separator feed stream.

2. The process according to claim 1, wherein the pH level is adjusted by adding sulfuric acid to the first stream.

3. The process according to claim 1, wherein a compound selected from the group consisting of a polyacrylamide, polyacrylate-based organic reagent and a combination thereof is added as the at least one flocculent to the first stream.

4. The process according to claim 1, wherein inorganic flocculants in the form of polyvalent ions are added as the at least one flocculant to the first stream.

5. The process according to claim 1, wherein flocs form in the first stream due to the presence of the at least one flocculant added to the first stream and the flocs are also present in the separator feed stream, wherein a floc-containing portion of the separator feed stream is added to the first stream.

6. The process according to claim 1, wherein the at least one auxiliary agent added to the first stream is selected from the group of mineral and organic bulk materials.

7. The process according to claim 1, wherein the at least one auxiliary agent added to the first stream is selected from adsorptive materials.

8. The process according to claim 1, wherein the at least one auxiliary agent added to the first stream is selected from carbon-containing particles and layer minerals.

9. The process according to claim 1, wherein the separating step comprises filtering the separator feed stream to separate a portion of the water in the separator feed stream from the particles in the separator feed stream.

10. The process of claim 1, wherein the separating step comprises feeding the separator feed stream to a tank and floating at least a portion of the particles of the separator feed stream as flocs in the tank.

11. The process according to claim 1, wherein the bulk material is pretreated mechanically by at least one step selected from the group consisting of comminuting any lumps contained in the bulk material, protective sieving of the bulk material to remove a portion of the bulk material having a larger size than suitable for a wet treating step, and subjecting the bulk material to a magnetic field to separate any magnetically attractable particles in the bulk material.

12. The process according to claim 1, further comprising mechanically dewatering the second stream to form a dewatered stream, drying the dewatered stream to form a dried stream, and cooling the dried stream to form a cooled stream, whereby the cooled stream is suitable for recycling to a foundry.

13. The process according to claim 1, further comprising conditioning the particles of the second particle stream by metered addition of at least one member of the group of acids, caustic soda solutions and surface-active agents thereto.

14. The process according to claim 1, further comprising conditioning the particles of the second stream by metered addition of sulfuric acid thereto.

15. The process according to claim 1, comprising recovering the particles from the product stream.

16. A process according to claim 1, further comprising subjecting the clarified water stream to a purifying step selected from the group consisting of UV oxidation, active carbon filtration, and a combination thereof to form a purified water stream.

17. The process according to claim 16, wherein the purified water stream is recycled to be added to the granular bulk material prior to the wet attriting step.

18. The process according to claim 16, wherein the UV oxidation is accelerated by adding at least one oxidant to the clarified water.

19. The process according to claim 18, wherein the oxidant added to the clarified water is selected from the group consisting of hydrogen peroxide, ozone and mixtures thereof.

20. An apparatus comprising:
   means for pretreating granular bulk materials comprising an attrition device for attriting the granular bulk materials in the presence of water to produce an attrited particle stream comprising particles of the attrited granular bulk materials and water;
   a classifying device for separating the attrited particle stream into a first stream comprising a first portion of the attrited particles and water and a second stream comprising a second portion of the attrited particles and water, the first portion of particles comprising particles having a smaller particle size than the particles of the second portion;
   means for adjusting a pH level of the first stream;
   at least one flocculation means for mixing at least one flocculent with the first stream to form a separator feed stream comprising the particles of the first stream; and
   a separating device for separating the particles in the separator feed stream from water in the separator feed stream.

21. The apparatus according to claim 20, wherein the separating device comprises a pre-coating filter.

22. The apparatus according to claim 20, wherein the separating device comprises a shear-cell filter.

23. The apparatus according to claim 20, wherein the separating device comprises a device for floating the particles in the separator feed stream.

24. The apparatus according to claim 20, further comprising means for purifying water separated by the separating device selected from the group consisting of a UV oxidation device, an active-carbon filter and a combination thereof.

25. The process according to claim 20, further comprising means for adding at least one auxiliary agent as carrier media to the first stream.

26. The apparatus according to claim 20, wherein the classifying device comprises at least one hydro-classifier.

27. The apparatus according to claim 26, wherein the hydro-classifier comprises a member selected from the group consisting of an up-current classifier, a hydro-cyclone classifier, and a spiral-type classifier.

28. The apparatus according to claim 20, further comprising a device for conditioning the second stream by adding a conditioning material thereto and means for passing the second steam from the classifying device to the conditioning device.

29. The apparatus according to claim 28, further comprising at least one treating member selected from the group consisting of a mechanical dewatering device, a cooling device, a drying device and combinations thereof, and means for passing the second stream from the conditioning device to said at least one treating member.

30. The apparatus according to claim 29, wherein the mechanical dewatering device comprises a member selected from the group consisting of a dewatering sieve, a plane filter, and combinations thereof.

\* \* \* \* \*